United States Patent [19]

Gritsch

[11] Patent Number: 4,561,076

[45] Date of Patent: Dec. 24, 1985

[54] SONAR METHOD AND APPARATUS

[75] Inventor: Herbert Gritsch, Achim, Fed. Rep. of Germany

[73] Assignee: Fried. Krupp Gesellschaft mit beschränkter Haftung, Essen, Fed. Rep. of Germany

[21] Appl. No.: 498,778

[22] Filed: May 27, 1983

[30] Foreign Application Priority Data

Jun. 4, 1982 [DE] Fed. Rep. of Germany ....... 3221013

[51] Int. Cl.$^4$ .............................................. G01S 15/89
[52] U.S. Cl. ........................................ 367/88; 367/99; 367/106
[58] Field of Search ...................... 367/87, 88, 99, 103, 367/105, 106

[56] References Cited

U.S. PATENT DOCUMENTS

| | | | |
|---|---|---|---|
| 3,504,333 | 10/1968 | Grada et al. | 367/108 |
| 3,810,082 | 5/1974 | Arens | 367/122 |
| 3,849,636 | 11/1974 | Helms | 340/24 X |
| 4,207,620 | 6/1980 | Morgera | 367/88 |

FOREIGN PATENT DOCUMENTS 1329829  9/1973  United Kingdom .

Primary Examiner—Richard A. Farley
Attorney, Agent, or Firm—Spencer & Frank

[57] ABSTRACT

A method and apparatus for underwater ranging with the aid of sonic pulses, by irradiating a given transmitting area with sonic energy pulses from a transmitter mounted in a marine vessel, receiving sonic energy echoes reflected from bodies in the transmitting area in a manner which is selective with respect to direction in a plurality of receiving sectors arranged in a fan shape, and associating the received echoes with respective reflection centers within the respective receiving sectors on the basis of associated sonic pulse travel times. Reception is carried out on a second marine vessel different from the vessel carrying the transmitter and which travels at a rearward offset position from the vessel carrying the transmitter at such a distance therefrom that the receiving sectors cover at least part of the given transmitting area, and the azimuthal width of the transmitting area is made very small. The associating operation includes determining the relative distance between the two vessels and the direction of the transmitting area, relative to the heading of the second vessel, at least at the moment of transmission of each sonic pulse, in order to associate the reflection centers with the echoes.

26 Claims, 14 Drawing Figures

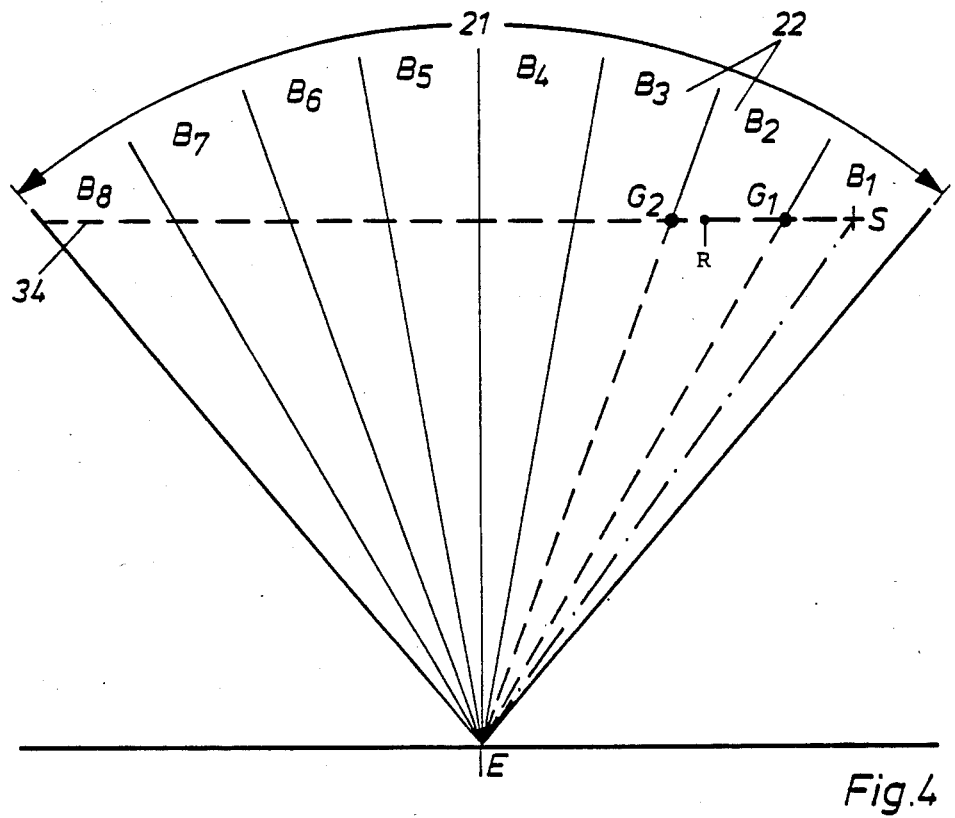
Fig. 4
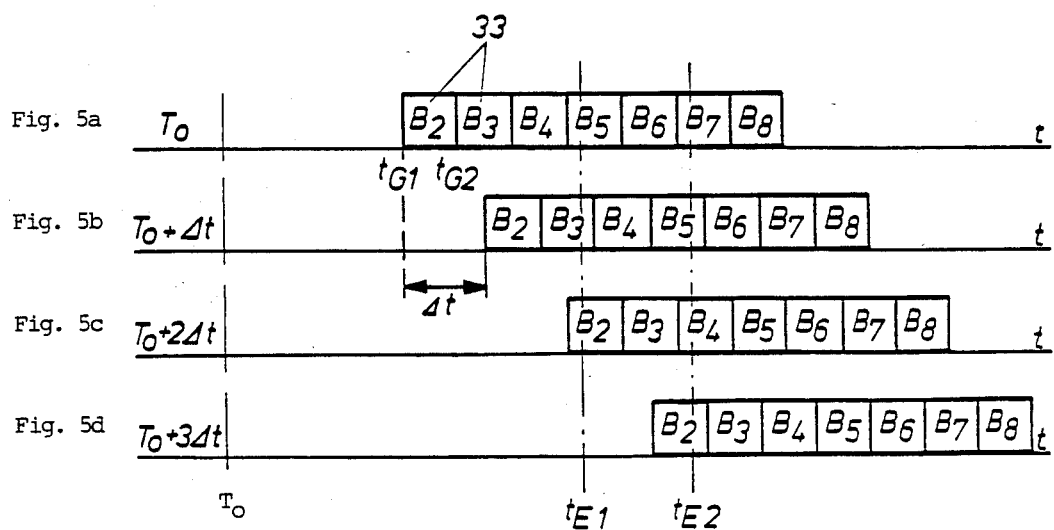
Fig. 5a
Fig. 5b
Fig. 5c
Fig. 5d

SONAR METHOD AND APPARATUS

BACKGROUND OF THE INVENTION

The present invention relates to a method for underwater ranging with sound pulses, particularly for the detection and/or classification of objects at or near the bottom of a water body.

In a known sonar device operating according to this method, the so-called lateral sight sonar, a transmitting transducer and a direction selective receiving device are arranged on a single marine vessel and both directional characteristics are oriented essentially transversely to the direction of travel of the vessel. The transmitting transducer emits sound over a relatively broad transmitting area transversely to the direction of travel of the vessel. The receiving device, which includes a receiving transducer whose length is substantially greater than that of the transmitting transducer, simultaneously covers a plurality of strip-shaped receiving regions lying within the transmitting area.

With such a sonar device, a relatively high rate of advance can be realized for the vessel and thus a high search and sweep output.

The quality of the solution, however, depends on the azimuthal width of the receiving regions, i.e. on the aperture angle of the receiving sectors emanating from the receiving transducer, such that the smaller the receiving sector, the higher the resolution quality. The rate of advance, however, depends on the aperture angle of the transmitted beam leaving the transmitting transducer and is directly proportional thereto. Since the entire transmitting area must be covered by the receiving sectors, a very large number of extremely narrow receiving sectors is required to obtain a useful resolution. This places very high demands on the receiving transducer as well as on the signal processing required for forming the receiving sectors, i.e. the receiving beams. The latter requires quite a considerable amount of computer capacity and a large amount of hardware.

Such a known sonar device, moreover, can be used only conditionally for the purpose of mine detection since the direction of detection being exclusively to the side of the direction of travel, the vessel carrying this sonar device may inadvertently enter a mine field and is thus always very much in danger. For purposes of mine detection, such sonar devices are therefore installed only on unmanned, or drone, ships and a second guide ship is required which accompanies the drone ship at a safe distance. Nevertheless, because of the high mechanical and electronic investment in the drone ship, the high risk of its loss is objectionable.

SUMMARY OF THE INVENTION

It is therefore an object of the present invention to improve the above-mentioned method in such a manner that the amount and complexity of the equipment required at the receiving end for the receiving transducers and to determine the direction is substantially reduced with simultaneous realization of a high resolution and a corresponding search performance.

A further object of the invention is to make possible the use of existing components, such as receiving devices with direction pre-equalization, of complete sonar systems serving other purposes and to make them usable for the purpose of the present invention with only relatively slight modification and/or retrofitting.

The above and other objects are achieved, according to the invention, by the provision of a novel method and apparatus for underwater ranging with the aid of sonic pulses, by irradiating a given transmitting area with sonic energy pulses from a transmitter mounted in a marine vessel, receiving sonic energy echoes reflected from bodies in the transmitting area in a manner which is selective with respect to direction in a plurality of receiving sectors arranged in a fan shape, and associating the received echoes with respective reflection centers within the respective receiving sectors on the basis of associated sonic pulse travel times. According to the invention, echo reception is carried out on a second marine vessel different from the vessel carrying the transmitter and which travels at a rearward offset position from the vessel carrying the transmitter at such a distance therefrom that the receiving sectors cover at least part of the given transmitting area, the azimuthal width of the transmitting area is made very small, and an associating operation is carried out by determining the relative distance between the two vessels and the direction of the transmitting area, relative to the heading of the second vessel, at least at the moment of transmission of each sonic pulse, in order to associate the reflection centers with the echoes.

The process according to the invention has the advantage that the degree of resolution is independent of the aperture angle of the receiving sectors and—aside from the length of the transmitted pulse—is determined only by the azimuthal width of the transmitting area. The costs for bundling, or concentrating, and focusing the sole transmitting beam, however, are much less than would be required to form a plurality of extremely narrow receiving sectors. In this way it is possible, with the method according to the invention, to use at the receiving end a conventional keel sonar system with directional pre-equalization at the receiving end, in which the azimuthal width of the receiving sectors, with about 2° to 8° aperture angle for the received beams, is not sufficient in the above-described prior art sonar device to realize a usable resolution accuracy.

Even keel sonars having a significantly larger aperture angle for their receiving sectors or receiving beams can be used without adversely affecting the resolution accuracy.

Only the maximum transmitting pulse repetition rate depends on the aperture angle of the receiving beams since the time intervals between successive transmitted pulses must be no smaller than the travel time of one transmitted pulse through a receiving sector in the transmitting direction.

The travel time increases with increasing aperture angle, thus reducing the transmitted pulse repetition rate. Therefore, the rate of advance of a system operating according to this method must be decreased so as to prevent the creation of uncovered zones. Thus, with the same resolution accuracy, the search performance of the system decreases with increasing azimuthal width of the receiving sectors.

The method according to the present invention thus permits the additional use of complete sonar systems, e.g. keel sonars having a planar or cylindrical base, provided in ships for other purposes, for the purpose of scanning the bottom of the sea and/or for mine detection or classification and the engineering expenditures required for this purpose are relatively low compared to a complete lateral sight sonar of the above-described type when employed for the same purpose.

The operating range of a sonar device operating according to the method of the present invention is at a considerably greater distance ahead of the guide ship carrying the receiving device than in conventional keel sonars sometimes used for mine detection. For the purpose of mine detection, this signifies a substantially improved protection of the guide ship.

Since the components, such as transmitting transducers and possibly navigation devices installed on the leading search ship constitute only a small part of the entire sonar system required to implement the method according to the invention, the magnitude of the loss which may occur during mine detection work is reduced considerably.

According to a particularly advantageous embodiment of the method according to the invention, the associating operation includes: assigning to each receiving sector an associated time window having upper and lower time limits, which time limits are determined on the basis of sonic energy travel times measured from the transmitter in the direction of the transmitting area up to the associated lateral boundary of the respective receiving sector and from there to the location of reception of the echoes, with the lower time limit being associated with the lateral boundary closer to the transmitter and the upper time limit being associated with the lateral boundary more remote from the transmitter location; determining the instant of transmission of a sonic pulse associated with a respective echo from the associated sound pulse travel time and the time window of the receiving sector in which the echo was received, the respective geometric location being determined for all those points for which the sum of their distances from the transmitting location at the determined moment of transmission, and from the receiving location at the moment of reception is constant and equal to the associated sound pulse travel time multiplied by the speed of sound in the water; and displaying a representation of the point of intersection of the curve formed by all those points with a line representing the transmitting direction originating at the transmitter at the moment of transmission, as the reflection center of the echo.

By associating time windows with the individual receiving sectors, it is possible to select the received echoes according to time of origin and location of origin without extensive computer requirements and in a simple manner. If the instant and locus of transmission of the echo are known, the reflection center of the echo can be calculated according to simple geometric relationships from the direction of transmission at the time of transmission and the sound pulse travel time under consideration of the distance between transmitting and receiving locations. The error inherent in this calculation depends merely on the aperture angle of the transmitted beam and on the length of the transmitted pulse.

A particularly advantageous apparatus for implementing the method according to the present invention is composed of transmitter means configured for emitting sonic energy in a pattern having a major lobe with a narrow azimuthal aperture angle which is substantially narrower than the aperture angle of each receiving sector, receiver means carried by the second marine vessel which, during operation of the apparatus, is to travel at a known distance from, and to the side and rear of, the first vessel such that the receiving area extends forwardly of the second vessel and covers at least part of the major lobe of the pattern in which sonic energy is emitted by the transmitter means, and signal processing means including echo equalizing means connected to the receiver means for associating echoes originating in the receiving area with the locations of objects in respective receiving sectors on the basis of associated sonic energy travel time and the distance between the vessels and the transmitting direction orientation at the moment of emission of the associated sonic energy pulse.

The compass systems provided furnish information regarding the momentary course of the first marine vessel and thus an accurate determination of the transmitting direction with respect to the course direction of the second vessel. The additional navigation sensors serve to increase the operational accuracy of the vessels. With the stated arrangement of the transducer elements on a circular arc, it is possible to realize extreme bundling of the major transmitting lobe with an azimuthal aperture angle of about 0.2°.

The present invention will now be described in greater detail with the aid of the embodiment of a sonar system which is illustrated in the drawing.

BRIEF DESCRIPTION OF THE DRAWING

FIG. 4 is a schematic pictorial view of the receiving region formed by eight receiving sectors in a receiving device disposed on the guide ship of FIG. 1.

FIGS. 5a, 5b, 5c and 5d are time diagrams of time windows associated with the receiving sectors in FIG. 4 for four successive transmitting times.

DESCRIPTION OF THE PREFERRED EMBODIMENTS

Figure 1:
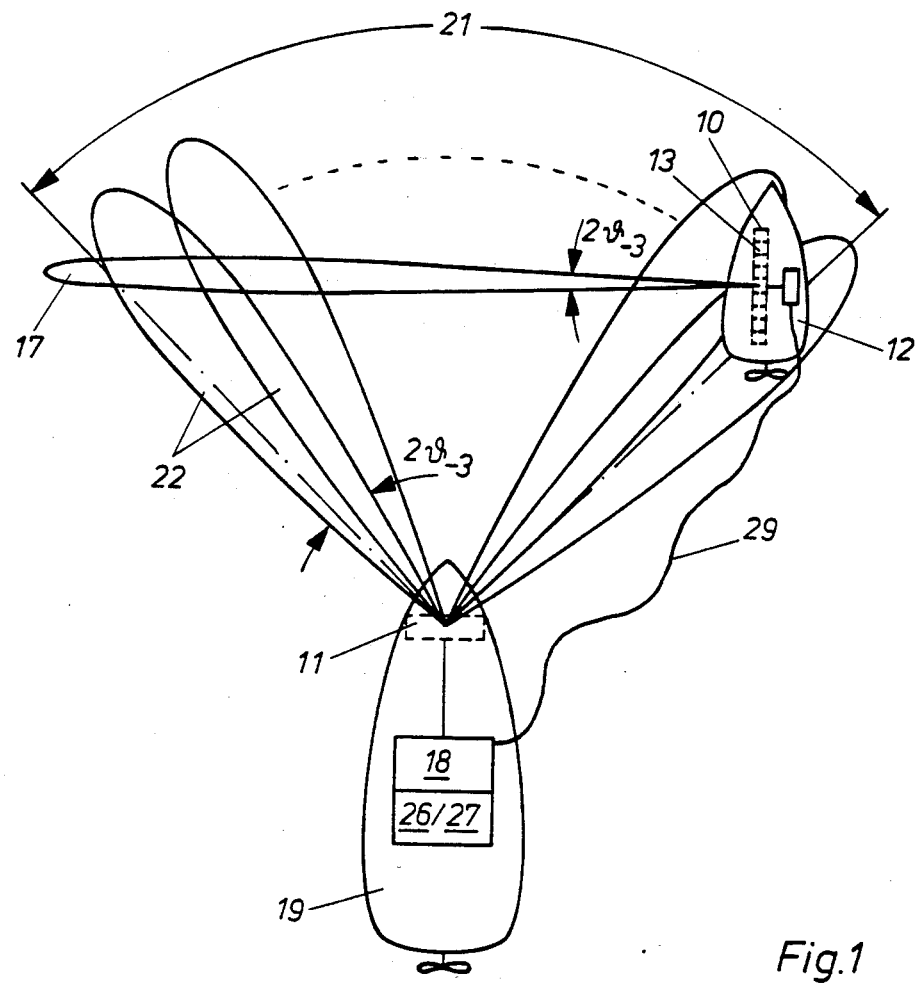
FIG. 1 is a pictorial top plan view of the sonar system according to the invention with search and guide ships.

FIG. 1 is a schematic plan view of a sonar system for scanning the bottom of a body of water for the detection and/or classification of objects disposed at or near the bottom, particularly ground mines. The sonar system includes a transmitting transducer 10 and a receiving transducer 11. The transmitting transducer 10 is disposed on a first marine vessel 12, the so-called search ship, and comprises a plurality of transducer elements 13 lined up in the longitudinal direction of the search ship 12.

Figure 2:
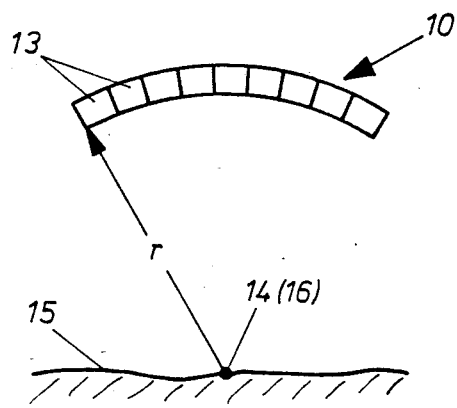
FIG. 2 is a schematic pictorial elevational view of the transmitting transducer disposed in the search ship of FIG. 1.

As shown in FIG. 2, the transducer elements 13 of the transmitting transducer 10 are arranged on a circular arc. With the usual operating distance r of the search ship 12 from the sea bottom 15, the center of curvature 14 of the arc lies below the transmitting transducer 10 at the level of bottom 15.

A line drawn through this center of curvature 14 and extending transversely to the longitudinal direction of the search ship 12 is called the focal line 16. With correct focusing, the focal line 16 extends at a right angle to a vertical plane defined by the row of transducer elements 13. Each point on the focal line 16 then always has the same distance from all transducer elements 13.

With this configuration of the transmitting transducer 10, it is accomplished that the major transmitting lobe 17 of the transmitting transducer 10 shown schematically in FIG. 1 is extremely tightly bundled, i.e. extremely narrow, in the horizontal direction, independently of the distance and has, in the illustrated example, an azimuthal aperture angle $2\theta_{-3}=0.2°$. In the vertical direction, however, the major transmitting lobe 17 is relatively wide.

Advantageously, the search ship 12 is designed as an underwater vehicle so that the working distance of the search ship 12 from the sea bottom 15 can always be selected to be equal to the given distance r of the transmitting transducer 10 from the focal line 16.

The receiving transducer 11 is part of a directional receiving device 18 and is disposed on a second marine vessel 19, which is the guide ship. The receiving transducer 11, shown schematically in FIGS. 1 and 3, may be a linear, circular, planar or cylindrical base equipped with a plurality of transducer elements 24. A beam former 20 creates a plurality of direction selective receiving channels so that the receiving region 21 of the receiving device 18 shown schematically in FIG. 1 is divided into a corresponding number of fan-shaped slightly overlapping receiving sectors, or main lobes, 22.

The receiving device 18 also includes a conventional signal processing device 23 connected behind the beam former 20 so as to detect—according to known methods of frequency and time filtering, amplitude regulation and/or threshold value detection—echoes in the received signals.

The receiving transducer 11 is disposed on the guide ship 19 in such a manner that the receiving range 21 of the receiving device 18 lies in the forward direction of the guide ship 19 as shown schematically in FIG. 1. The guide ship 19 travels at a known distance, slightly offset to the side, behind the search ship 12 so that the receiving sectors 22 of the receiving range 21 of the receiving device 18 at least in part cover the main transmitting lobe 17 radiated by the transmitting transducer 10.

According to the method for detecting and classifying objects near the bottom of the sea 15, a given transmitting region is covered with water-conducted sound pulses in a horizontally narrow and vertically wide beam. For this purpose a transmitter 25 is provided on the search ship 12 to generate electrical pulses of given duration, carrier frequency, clock pulse rate and transmitting power and to feed them to the transmitting transducer 10. Echoes reflected in the transmitting region are received by the guide ship 19 by means of receiving device 18 and in a direction selective manner associated with receiving sectors 22.

For each received echo, the sound travel time is determined. At the same time, the relative distance between the search ship 12 and the guide ship 19 and the transmitting direction are determined and with the aid of the lobe 22 in which the echo originated, or the associated receiving channel, the point in time of the corresponding transmitting pulse is determined. These parameters are then used to determine, with the aid of an equalization calculation in an echo equalizer 26, the locations of the reflection centers of the received echoes within the receiving sectors 22 in a correct association with respect to position. These locations are then mapped and stored by means of a recording device 27.

In order to determine the transmitting direction of the transmitting transducer 10, the course of the search ship 12 is continuously monitored by means of a compass 28 and is fed, via a signal cable 29, to the guide ship 19 and from there to the echo equalizer 26.

In order to take account of the instantaneous position of the individual receiving sectors 22, the course of the guide ship 19 is also continuously monitored by a compass 30 whose output is likewise fed to the echo equalizer 26.

To precisely determine the position of the search ship 12 with respect to the guide ship 19, i.e. to determine the distance between the two ships, the transmitted pulses are additionally directly received and evaluated by the transmitting transducer 10. If the search ship 12 has a position relative to the guide ship 19 as shown in FIGS. 1 and 4 each transmitted pulse is directly received via sector $B_1$. Of course the transmitted pulses can be also directly received via side lobes of one of the direction selective receiving channels. The distance between the ships is directly dependent upon the time between the transmitting and the receiving of each directly received pulse. The moment of transmitting is known.

In order to increase operational accuracy, navigation sensors 21 and 32, respectively, are provided on the search ship 12 as well as on the guide ship 19, with their data likewise being fed to the echo equalizer 26, for navigation sensor 21 of the search ship 12 this being effected via signal cable 29. The navigation sensors 31 and 32 which serve to precisely determine the course and position of search ship 12 and guide ship 19, respectively, may be designed, for example, as known Doppler navigation sonars. Such a Doppler navigation sonar is disclosed, for example, in U.S. Pat. No. 3,849,636 issued to Horst Helms.

In the echo equalizer 26, the association of echoes received via receiving sectors 22 with reflection centers in the transmitting area covered by the major transmitting lobe 17 of transmitting transducer 10 is effected according to the following method, which will be described with reference to FIGS. 4 and 5:

To equalize the echoes, i.e. to associate the echoes with the respective reflection centers from which they have been generated, time windows 33, shown in FIG. 5, each having a lower time limit $t_{G1}$ and an upper time limit $t_{G2}$, are each associated with a respective individual receiving sector 22, i.e. with a respective receiving channel of the receiving device 18. FIG. 5 show the time windows 33 as a function of time for seven of the receiving sectors $B_2$ to $B_8$ shown schematically in FIG. 4, at individual transmitting times $T_0$, $T_0+\Delta t$, $T_0+2\Delta t$ and $T_0+3\Delta t$ of FIGS. 5a, 5b, 5c and 5d, respectively.

Referring to FIG. 4, the time limits $t_{G1}$ and $t_{G2}$ are determined on the basis of the sound pulse travel times in the transmitting direction 34 measured from the point of transmission S (transducer 10) to the respective lateral edge $G_1$ or $G_2$ of the associated receiving sector 22 ($B_2$ to $B_8$) and from there to the point of reception E (transducer 11). The lower time limit $t_{G1}$ is here associated with a reflection at the receiving sector front boundary $G_1$ closer to the point of transmission S in the transmission direction 34 and the upper time limit $T_{G2}$ is associated with a reflection at the receiving sector rear boundary $G_2$ which, when seen in the transmitting direction 34, is more remote from the transmission point S. The length of the path S-$G_1$-E, divided by the speed of sound in water provides the lower time limit $t_{G1}$ and the length of the path S-$G_2$-E, divided by the speed of sound in water provides the upper limit $t_{G2}$ for the time window 33 associated with receiving sector $B_2$. The remaining time limits for the subsequent individual receiving sectors $B_3$-$B_8$ increase with increasing distance of the individual receiving sector 22 from the transmission location S, with the respective time limits of adjacent receiving sectors 22 differing from one another at least by the travel time of a sound pulse in direction 34 through a receiving sector 22.

In the illustrated example, it has been assumed that the transmitting transducer 10 emits successive transmitting pulses at time intervals $\Delta t$. Transmission begins at time $T_0$. The transmitting pulse repetition rate is therefore $1/\Delta t$. The transmitting pulse period is here dependent upon the width of the receiving sectors 22 when seen in the transmitting direction 34. The period must be at least large enough that one transmitted sound pulse has already left a receiving sector 22 before the next following transmitted sound pulse enters the same receiving sector 22.

With the emission of each further transmitting pulse, the time windows 33 of the individual receiving sectors 22 are shifted toward successively longer times relative to $T_0$, in each case by this time interval $\Delta t$.

FIGS. 5a-5d show such a time pattern for the time windows 33 for four successive transmitting times, separated from one another by a transmitting interval $\Delta t$. These time windows 33 enable the receiving sectors 22 to receive according to a defined time pattern. For example, at one point in time $t_{E1}$ after $T_0$ at which an echo is being received, receiving sectors $B_5$, $B_3$ and $B_2$ are enabled. Since the echo received at time $t_{E1}$ is being received e.g. in receiving sector $B_2$, it can be determined without difficulty that the echo originates from the sound pulse transmitted at time $T_0+2\Delta t$. If in the point in time $t_{E1}$ an echo would be detected e.g. in receiving sector $B_5$ respectively $B_3$ than this echo must be originated from a sound pulse transmitted at time $T_0$ respectively $T_0+\Delta t$. From the travel time $t_{E1}$ of the sound pulse, calculated from beginning of transmission at $T_0$, and from the time window 33 of the receiving sector 22 in which the echo has been received, it is thus possible to determine the transmission time, in the illustrated example $T_0+2\Delta t$, and the transmission location $S(T_0+2\Delta t)$ (FIG. 6) of the sound pulse which actuated the echo.

Since thus the original sound pulse travel time is known, i.e. the time from emission of the sound pulse until its arrival in the receiving device, in the illustrated example the time period between the time of transmission $T_0+2\Delta t$ and the time of reception $t_{E1}$, it is now possible to determine the location of the reflection center R of this echo.

To do this, the geometric location is determined for all points for which the sum of their distances from the location of transmission S at the determined time of transmission (in the illustrated example $T_0+2\Delta t$) and the receiving location E at the time of reception (in the illustrated example $t_{E1}$) is constant and equal to the associated sound pulse travel time multiplied by the speed of sound. The resulting position curve 35 for all these geometrical locations is an ellipse and is shown for the above-mentioned example in FIG. 6. Since the course of the search ship 12 is being monitored continuously, the transmitting direction 34 is also known at every point in time, i.e. at the time of transmission, in the illustrated example at $T_0+2\Delta t$. The point of intersection of the transmission direction 34 with the position curve 35 indicates the reflection center R of the echo received at time $t_{E1}$.

Figure 7:
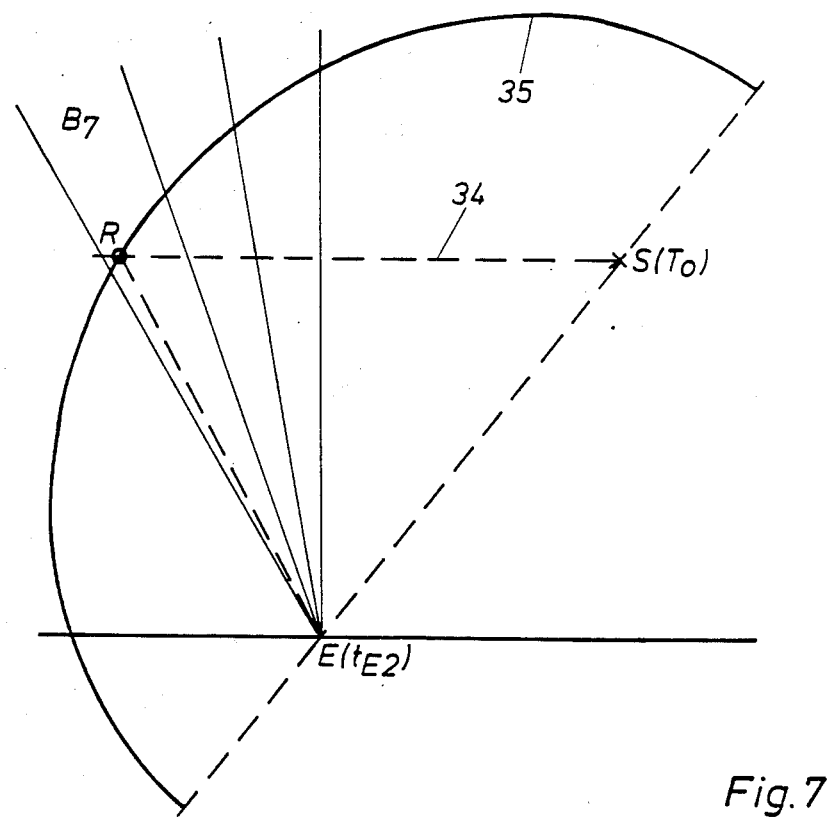

FIG. 7 shows a further example of an echo received at time $t_{E2}$. In this example it is supposed that at time $t_{E2}$ an echo is received in the receiving sector $B_7$ (FIG. 5). As can easily be seen, the ecoh received pursuant to the given time pattern in receiving sector $B_7$ must originate from a sound pulse emitted at the transmitting location S at time $T_0$. The reflection center R results in the same manner as described above and as can easily be seen in FIG. 7.

Figure 6:
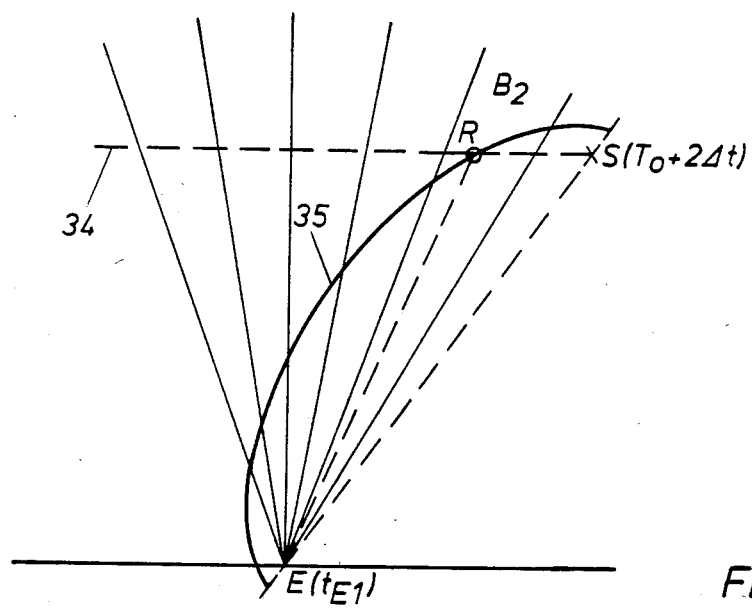
FIGS. 6 and 7 are diagrams showing two examples of the spatial association of reflection center and location of transmission and reception at two different echo reception times.

The accuracy of the determination of the reflection center R depends only on the azimuthal width of the major transmission lobe 17. For the sake of simplicity, FIGS. 4, 6 and 7 show the transmitting direction 34 as the center line of the major transmission lobe 17. With an aperture angle in the major transmission lobe $2\theta_{-3}$ of 0.2°, the possible error is relatively slight.

As in the known lateral sight sonar, the above-described sonar system and the above-described method, respectively, likewise furnish an image of the structure of the bottom of the sea 15 and of the objects at or near this bottom. In the same way, a so-called shadow of the object is formed at the bottom 15—as known in connection with lateral sight sonars—with the aid of which the detected object can be classified. The performance capability of the above-described search system depends only on the azimuthal width of the receiving sectors 22. The smaller the azimuthal aperture angle of the receiving sectors 22, the higher can be the transmitting pulse repetition rate and thus the rate of advance of both ships carrying the sonar system. The number of available juxtaposed receiving sectors determines the width of the search area covered during travel of the search system. The range of suitable angular widths of each receiving sector 22 is about $2° \leq 2\theta_{-3} \leq 30°$.

In order to keep the computer expenditures for the echo equalizer 26 as low as possible, it is of advantage to have search ship 12 and guide ship 19 travel parallel to one another on the same course and at the same speed, so that the distance between guide ship 19 and search ship 12 always remains constant. Changes in course of search ship 12 have an influence only on the direction of transmission, changes in course of the guide ship 19 influence the position of the receiving range 21 of the receiving device 18, and both have an influence on the relative position of guide ship 19 to search ship 12 and thus on the distance between the two. If the parameters for transmission direction and relative distance cannot be kept constant, they must be considered in the equalization computation.

The present invention is not limited to the above-described embodiment. Thus it is also possible for the echo equalization to omit the time windows associated with receiving sectors 22 and instead determine the sound pulse travel times of an echo received at a reception time for all possible transmission times. In this case, those transmission times at which the determined signal travel time is less than the time distance of the location of reception from the location of transmission at the respective moment of transmission should be excluded. Likewise, those transmission times should be excluded which result in signal travel times greater than the travel time required by a sound pulse from the point of transmission in the transmission direction transversely through the receiving region 21 until it is reflected at the end of the receiving region 21 and from there to the point of reception. The remaining differences in travel time are emitted as sound pulse travel times.

For each pairing of reception location with one of the transmission locations for which a sound pulse travel time has been determined, the geometric position of all those points is determined for which the sum of the time intervals, with respect to the speed of sound, between reception location and transmission location is constant and equal to the associated sound pulse travel time. The position curve for these points is again an ellipse. Thus an ellipse results for every pairing of reception location with one of the possible transmission locations. These ellipses intersect the transmission directions originating from the possible transmission points. Only those points of intersection that lie in receiving sectors in which echos were received at the time of reception are relevant reflection centers.

Figure 3:
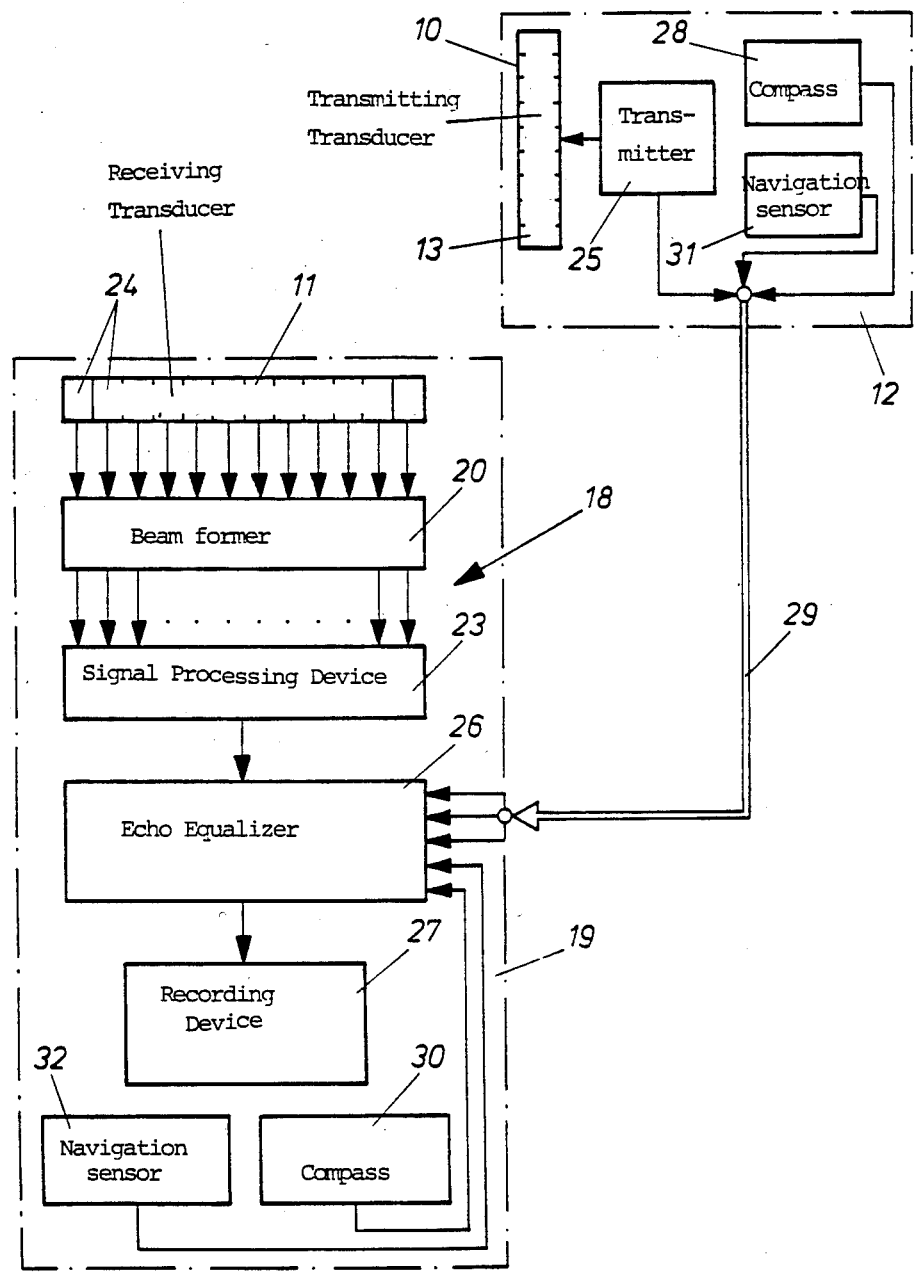
FIG. 3 is a block circuit diagram of the circuit components of the sonar system of FIG. 1.

One possible embodiment of the beam former 20 of the circuit of FIG. 3 is disclosed in U.S. Pat. No. 3,810,982. In the example of FIG. 4 employing a total of eight beams or receiving sectors 22, the beam former 20 forms eight directional channels whose received signals are processed separately in the connected signal processing device 23.

The signal processing device 23 serves to extract the target echoes from the received signals. A possible embodiment of such a signal processing device for one directional channel is disclosed in U.S. Pat. No. 3,504,333. The extracted target echoes are available at the output of the signal processing device 23 separately for each directional channel and are fed to the echo equalizer 26 which performs the association of the respective target echo with the individual beams and determines the exact position of the target, i.e. of the reflection center of the sound pulses, within a receiving sector 22.

Figure 8:
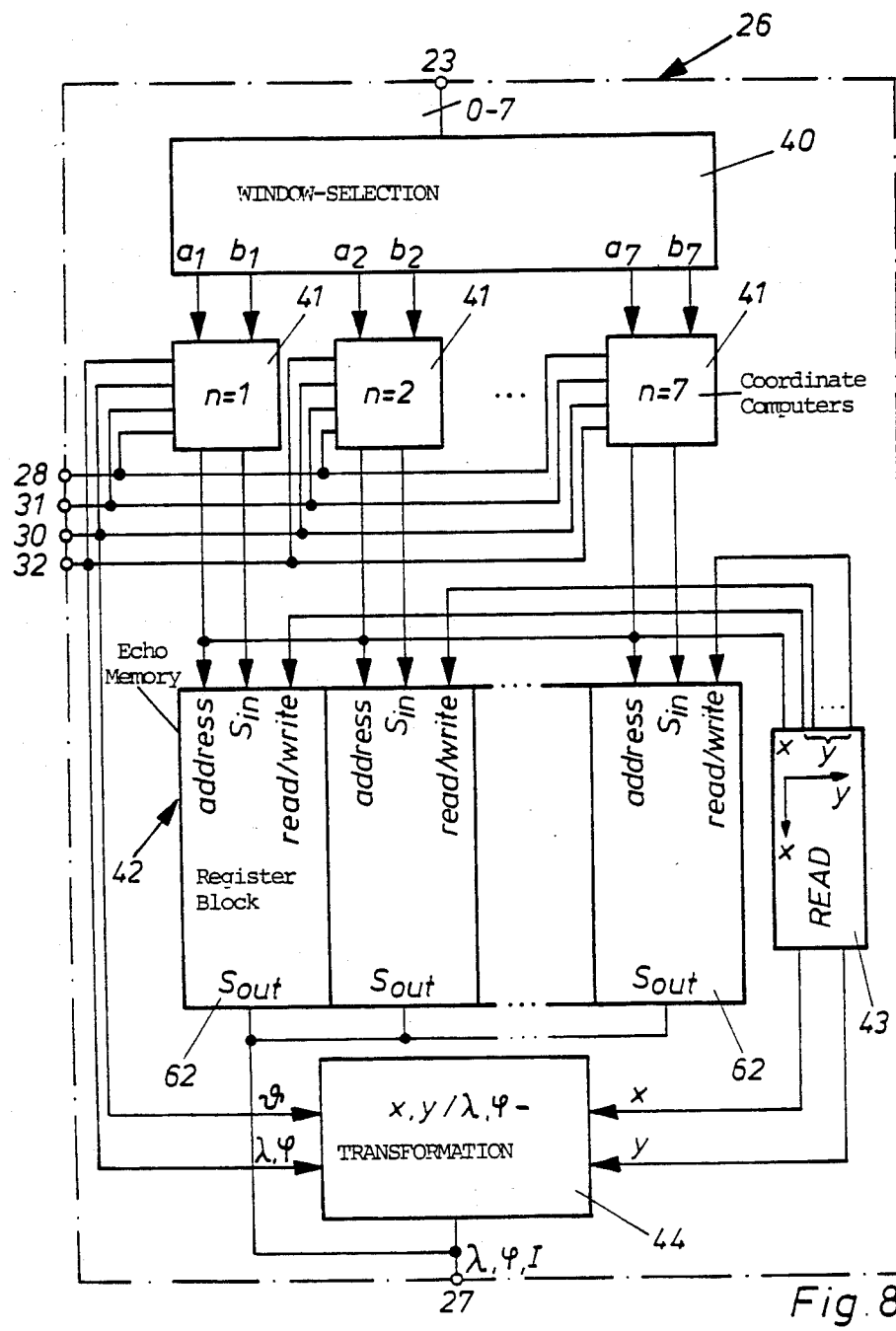
FIG. 8 is a block circuit diagram for the echo equalizer of the circuit of FIG. 3.

A block circuit diagram of a preferred embodiment of the echo equalizer 26 is shown in FIG. 8. Course and position of the search and guide ships are fed to the echo equalizer 26—as described in connection with FIG. 3—via the terminals 28, 31, 30 and 32, which are numbered to coincide with the components connected thereto, i.e. compasses 28 and 30, respectively, and navigation sensors 31 and 32, respectively, of search and guide ships 12 and 19, respectively. One embodiment of a navigation sensor 31 or 32 is disclosed in U.S. Pat. No. 3,849,636. The navigation sensor described in that patent furnishes information identifying the exact position of its associated ship according to geographic longitude and latitude ($\lambda$, $\phi$), while the compass 28 or 30, respectively, determines the north related course angle $\theta$.

The echo equalizer 26 is provided with a window selection device 40, a plurality of coordinate computers 41, an echo memory 42 with readout device 43 and possibly a coordinate transformer 44 to convert the x, y coordinates computed in coordinate computers 41 with reference to the search ship 12 into geographic longitude $\lambda$ and latitude $\phi$ representations.

Figure 11:
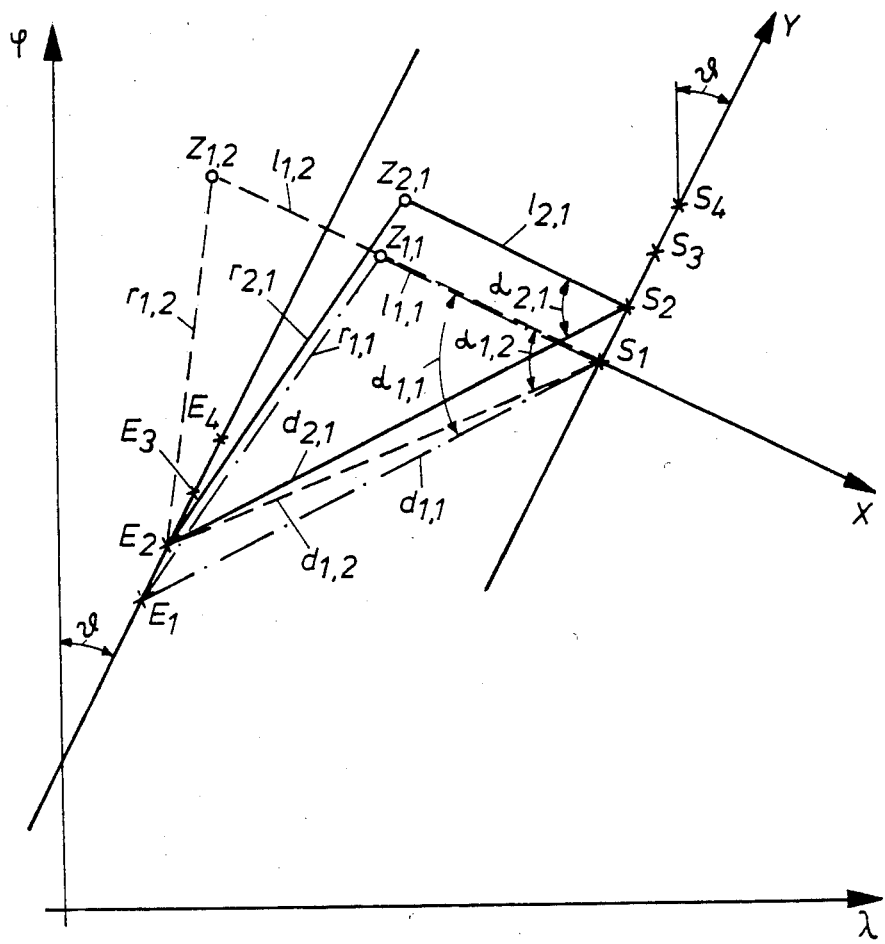
FIG. 11 is a diagram illustrating the relation between search ship and guide ship at several transmitting and receiving locations.

To explain the function of echo equalizer 26, reference is initially made to FIG. 11 in conjunction with FIG. 4. FIG. 11 shows successive transmission positions $S_n$ (n=1, 2, 3, 4) of search ship 12 and the receiving positions $E_i$(i=1, 2, 3, 4) of the guide ship 19 at four different points in time. The moving transmitter 25 transmitting at a transmitting pulse repetition rate $f=1/\Delta t$ transmits, for example, its first pulse at transmission location $S_1$. When the second pulse is emitted, which occurs $\Delta t$ later, its transmission point is $S_2$, while the reception location has moved from $E_1$ to $E_2$ so that the transmitted pulse emitted by transmitter 25 at transmission point $S_n$, e.g. $S_1$, after being reflected at a target $Z_{n,i}$, e.g. $Z_{1,2}$, is received by receiver 18 at the reception location $E_i$, e.g. $E_2$. The relation between the transmission and reception locations, i.e. the distance between search ship 12 at the time of a transmission and guide ship 19 at the time of the associated reception, represented by a line $d_{n,i}$ in FIG. 11. With respect to this connecting line, transmitter 25 transmits at an angle $\alpha_{n,i}$. For the sake of simplicity, it is assumed that search ship 12 and guide ship 19′ travel along the same course at the same speed.

Each transmitted pulse emitted by transmitter 25 is now associated with a separate coordinate computer 41 so that the echo equalizer 26 must have a number of coordinate computers 41 equal to the number of transmitted pulses travelling simultaneously through the receiving region 21. As soon as one transmitted pulse has left receiving region 21, the associated coordinate computer 41 is free and can be associated with a new transmitted pulse.

With the aid of the window selection device 40, each emitted transmitting pulse is now quasi followed on its path through the water, each coordinate computer 41 having one set of associated time windows 33 for that purpose, as shown in one of FIG. 5. The time windows 33 of that set are opened in succession, for the duration of the width of each window $t_{G2}-t_{G1}$, with only one of the windows 33 associated with a coordinate computer 41 being open at any one time.

Each coordinate computer 41 is connected, during one of its associated time windows 33, with one of the receiving channels associated with receiving sectors 22 in receiving device 18, via one of lines 0, 1, ... 7 shown in FIG. 9, to be described below, each carrying the processed received signals from a respective one of receiving sectors $B_1$, $B_2$ ... $B_8$. The width of the windows ($t_{G1}-t_{G2}$) corresponds to the travel time of the transmitted pulse in the transmitting direction across a receiving sector 22. For the sake of simplicity, it is assumed in FIG. 5 as well as in the block circuit diagram of FIG. 9 that the travel time of the transmitting pulse through all receiving sectors 22 and thus the width of all time windows, is identical which is the case only if the distance between guide ship 19 and search ship 12 is large. As can be seen in FIG. 4, however, in reality the travel time of the transmitted pulse is less through the center receiving sectors $B_3-B_6$ than through the outer receiving sectors $B_1$, $B_2$ and $B_7$, $B_8$ of receiving region 21. The resulting different widths of time windows 33, however, can be realized without difficulty and with little technical expenditures in the embodiment of window selection device 40 shown in FIG. 9.

The beginning of opening of a window 33 associated with a coordinate computer 41 is shifted with respect to the beginning of opening of windows 33 associated with the subsequent of preceding coordinate computer 41 by a time interval which corresponds to the transmitting pulse period $\Delta t$. A subsequent or preceding coordinate computer is understood to mean a coordinate computer which is associated with a subsequent or preceding transmitting pulse in the transmitting pulse sequence.

Figure 9:
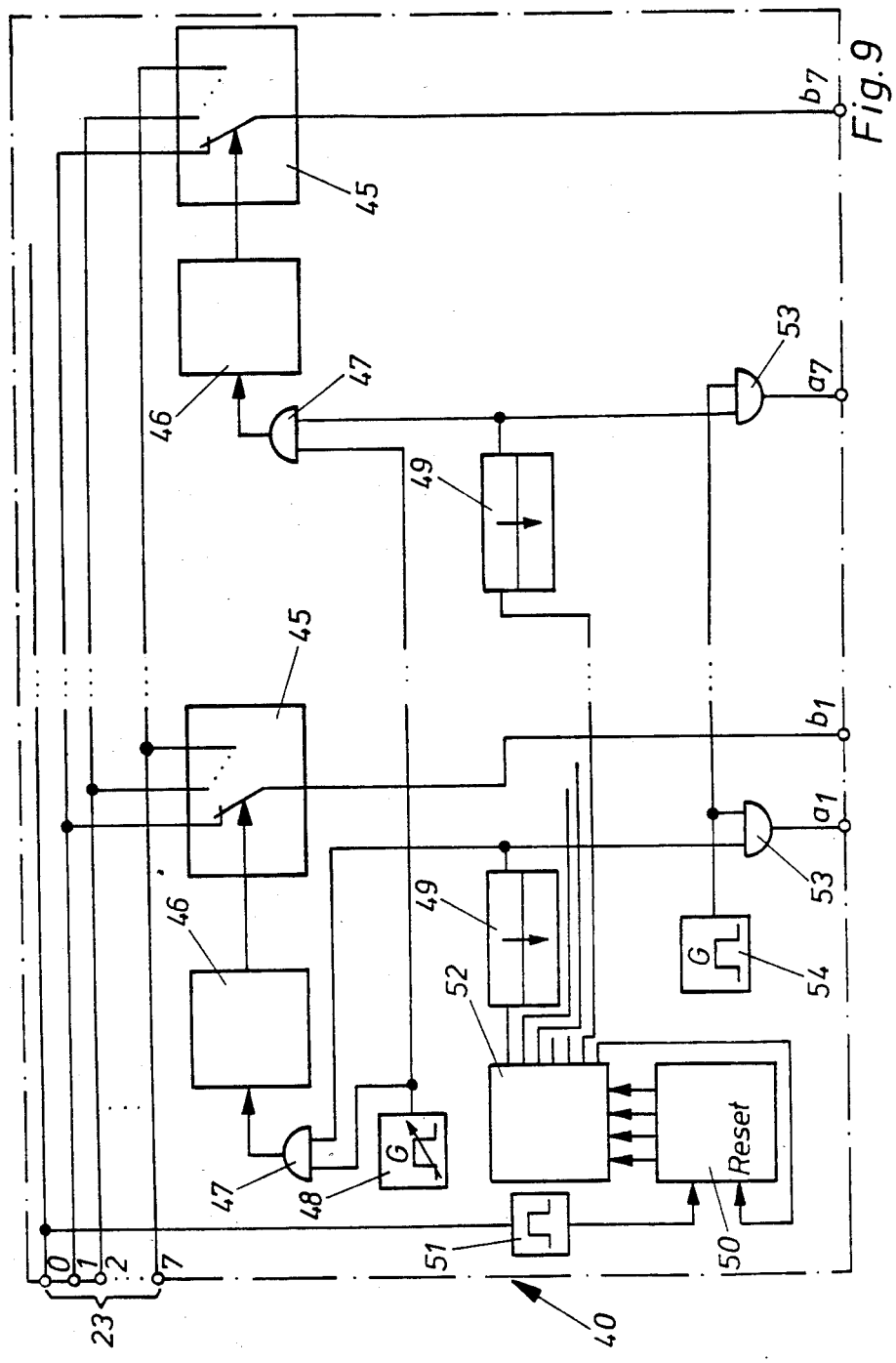
FIG. 9 is a block circuit diagram of an embodiment of a window selection device in the echo equalizer of FIG. 8.

Advisably, the beginning of opening is actuated by the direct reception of the transmitted pulse so that the first window 33 of the first coordinate computer 41 (n=1) is opened if the direct signal from the first transmitted pulse is detected in receiving device 18 in receiving channel 0 in FIG. 9, since transmitter 25 is disposed in receiving sector $B_1$, and the first window 33 of the second coordinate computer 41 (n=2) is opened with the arrival of the direct signal of the second transmitted pulse. Windows 33 associated with various coordinate computers 41 may here be open simultaneously.

The windows 33 associated with the individual coordinate computers 41 are each generated in the window selection device 40 of FIG. 9 by a respective multiplexer 45 with appropriate time control. The number of multiplexers 45 corresponds to the number of coordinate computers 41. Each input of each multiplexer 45 is connected to a respective one of the receiving channels 1–7 associated with receiving sectors 22 and realized by the signal processing device 23 as identified in FIG. 9 in their entirety by the reference numeral 23.

The output of each multiplexer 45 is connected with its associated coordinate computer 41. The control input of each multiplexer 45 is connected to an associated counter 46. With each counting pulse at the input of counter 46, the latter switches the associated multiplexer 45 to the next receiving or directional channel 1–7 so that only one directional channel 1–7 is connected with the associated coordinate computer 41 for the duration of the open window.

Between successive switchings of multiplexer 45 there elapses the time difference interval $t_{G2}-t_{G1}$ which corresponds to the width of the window, i.e. the travel time of a transmitted pulse through a receiving sector 22 defined by the borders $G_1$ and $G_2$. If all windows have a constant width, counters 46 can be driven with a counting pulse rate which is the reciprocal of the travel time of one transmitted pulse in the transmitting direction through a receiving sector 22. In that case, the counting input of each counter 46 is connected to a pulse generator 48 via a respective AND gate 47. The other input of each AND gate 47 is connected to a respective one-shot multivibrator 49 whose on-time corresponds to the time period required by a transmitted pulse to pass through the entire receiving region 21 in the transmitting direction.

Each multivibrator 49 is set after arrival of the direct signal generated by the respectively transmitted pulse in receiver 18. The first one-shot multivibrator 49, associated with the first coordinate computer 41 (n=1), is set upon the arrival of the direct signal from the first transmitted pulse coming from transmitting location $S_1$, the second multivibrator 49, associated with the second coordinate computer 41 (n=2), is set with the arrival of the direct signal from the second transmitted pulse originating from transmitting location $S_2$, etc. Setting of each one-shot multivibrator 49 switches through, or enables, the respective AND gate 47 so that the counting pulses from the pulse generator 48 can reach the respective counter 46.

A counter 50 is provided to set the one-shot multivibrators 49. With guide ship 19 and search ship 12 in the positions shown in FIG. 4, in which transmitter 25 at transmitting location S is always located in receiving sector $B_1$, the counting input of counter 50 is connected via a pulse former 51 with the direction channel 0 associated with receiving sector $B_1$. The direct signal from transmitter 25 received through this direction channel 0 thus reaches counter 50 as a counting pulse. By means of a decoder 52, the first one-shot multivibrator 49 is set in response to the first transmitted pulse, the second one-shot multivibrator 49 is set after the second transmitted pulse, the third one-shot multivibrator 49 is set after the third transmitted pulse, etc.

Each multivibrator 49 also controls a further associated AND gate 53 whose other input is connected to a clock pulse generator 54 to generate a clock pulse. The outputs of AND gates 53 are connected, via terminals $a_n$, where n=1, 2 ... 7, with the respectively associated coordinate computer 41 and the outputs of multiplexers 45 are connected, via terminals $b_n$, with their respectively associated coordinate computers 41.

Figure 10:
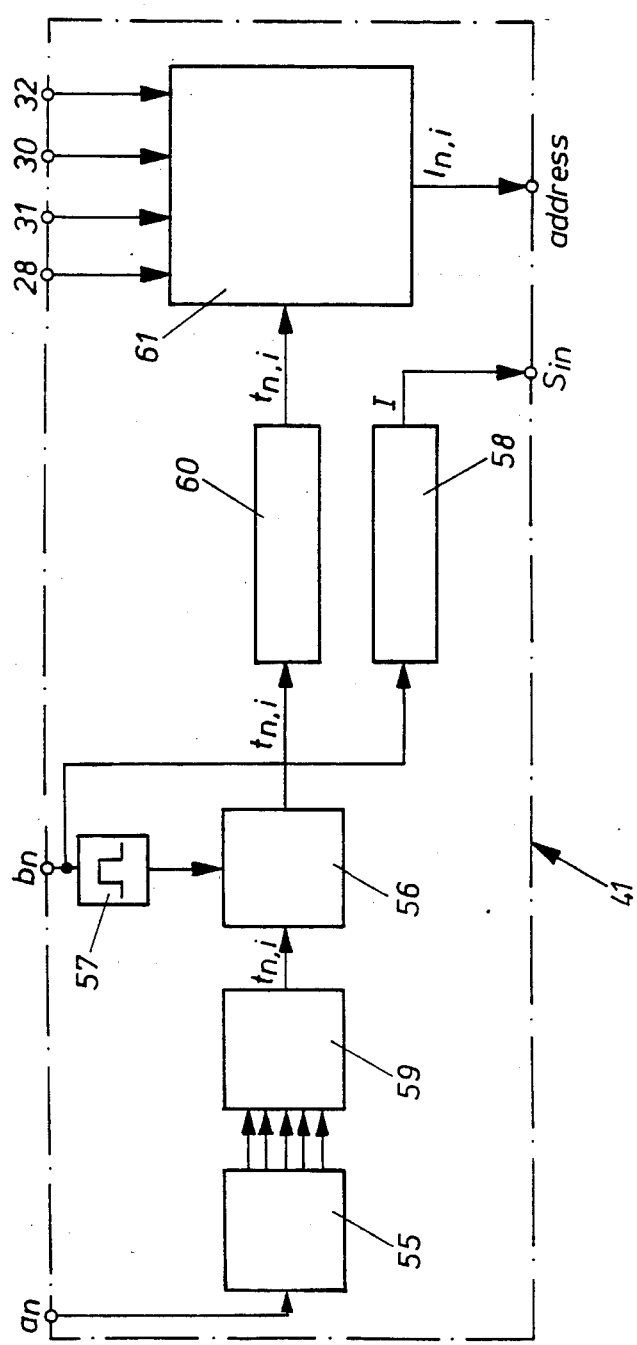
FIG. 10 is a block circuit diagram of an embodiment of a coordinate computer in the echo equalizer of FIG. 8.

FIG. 10 shows one preferred embodiment of a coordinate computer 41. Input $a_n$, which corresponds to output $a_n$ of the window selection device 40, is connected to the counting input of a time counter 55 while input $b_n$, which corresponds to output $b_n$ of the window selecting device 40, is connected, on the one hand, to the control input of a gate 56 via a pulse former 57 and, on the other hand, to the input of a register 58 for storing the amplitude information (intensity) of the target echoes.

Time counter 55 is connected to a decoder 59 which decodes the respective counter content of time counter 55 and passes it as time information to the input of gate 56. With gate 56 open, the time informaion is written into a register 60 in parallel with the input of amplitude information to register 58. Since gate 56 is always opened by a detected target echo in the respective direction channel 1, 2 ... 7, the decoded counter content of time counter 55 is also written into register 60 via the open gating member 56 whenever the amplitude of this target echo is written into register 58. Since the time measurement by time counter 55 begins only upon the arrival of the direct signal of the transmitted pulse in receiver 18, i.e. when the transmitted pulse has passed through $d_{n,i}$ (FIG. 11), the time value $t_{n,i}$, written into register 60 corresponds to the equation $$t_{n,i} = \frac{1}{c} (l_{n,i} + r_{n,i} - d_{n,i}) \tag{1}$$

where n is the ordinal of the transmitted pulse originating from transmitting point $S_n$ in the transmitting direction 34, i is the ordinal of the targets $Z_{n,i}$ irradiated by the respective transmitted pulse; $l_{n,i}$ is the distance between transmitting location $S_n$ and location of the target $Z_{n,i}$; $r_{n,i}$ is the distance between target location $Z_{n,i}$ and receiving location $E_i$; and c is the speed of sound in the water. The corresponding values can easily be found in FIG. 11.

The output of register 60 is connected to a path computer 61 which is also connected to the inputs 28, 31, 30 and 32 of the echo equalizer 26, i.e. with compasses 28 and 30, respectively, and with navigation sensors 31 and 32, respectively, of search ship 12 and guide ship 19. Path computer 61 now calculates from its input values the paths $l_{n,i}$ between transmitting location $S_n$ and targets $Z_{n,i}$ according to the following equation $$l_{n,i} = \frac{c \cdot t_{n,i}}{2} \cdot \frac{c \cdot t_{n,i} + 2d_{n,i}}{c \cdot t_{n,i} + d_{n,i}(1 - \cos\alpha_{n,i})} \quad (2)$$

Equation (2) can be derived from the geometric relationships shown in FIG. 11 under consideration of equation (1) and equation (3)

$$r_{n,i}^2 = l_{n,i}^2 + d_{n,i}^2 - 2\, l_{n,i}\, d_{n,i} \cos\alpha_{n,i} \quad (3)$$

wherein c is the speed of sound; $d_{n,i}$ can be calculated from the ship positions provided in degrees longitude and latitude by navigation sensors 31 and 32, as follows:

$$d_{n,i} = \sqrt{(\phi_S - \phi_E)^2 + (\lambda_S - \lambda_E)^2} \quad (4)$$

The angle $\alpha_{n,i}$ results from the known transmitting direction 34, the north-related course angle $\theta$ and the positions of search ship 12 and guide ship 19 at the time of transmission and reception, respectively. If transmitter 25 transmits at a right angle with respect to the course of search ship 12 (FIG. 11), the following results:

$$\alpha_{n,i} = \nu + \arctan\frac{\phi_S - \phi_E}{\lambda_S - \lambda_E} \quad (5)$$

where $\phi_S$, $\lambda_S$ and $\phi_E$, $\lambda_E$ are the coordinates of the respective transmitting and receiving location $S_n$ and $E_i$ respectively.

As can be seen in FIG. 8, a register block 62 with address input and information input is associated within echo memory 42 with each coordinate computer 41. Thus, the first coordinate computer 41 (N=1) writes exclusively into the left-hand register block 62 of echo memory 42, the second coordinate computer writes 41 (n=2) only into the second register block 62, etc.

The path $1_{n,i}$ calculated by path computer 61 forms the address under which the amplitude information of the associated target echoes is written into the respective register block. Thus, the left-hand register block 62 contains only amplitude informations for targets $Z_{l,i}$ which were covered by the transmitted pulse from transmitting location $S_1$. The register block 62 next to it contains only targets $Z_{2,i}$ covered by the transmitting pulse from transmitting location $S_2$, etc. If a plurality of targets were covered by the same transmitted pulse, the respective register blocks 62 contain several amplitude indications with respective association to path $1_{n,i}$.

In order to display the amplitude information of the target echoes stored in echo memory 42, the readout device 43 generates readout addresses x and readout addresses y. The x address output of the readout device 43 is connected with the address input of the individual register blocks 62 while a number of y address outputs in the readout device 43 corresponding to the number of register blocks 62 are each connected to the respective "read/write" control instruction input of a register block 62. The amplitude information representations of the target echoes are already stored in their correct position in echo memory 42 according to an x,y coordinate system which originates in the first transmitting location $S_1$ and whose y axis is identical with the course of the search ship 12 while its x axis lies in the transmitting direction. If now register blocks 62 are read out in succession, the targets and their reflection centers $Z_{n,i}$, respectively, can already be displayed in the display device 27 in their correct positions in such an x,y coordinate system. If these reflection centers $Z_{n,i}$ are also to be displayed in a north referenced coordinate system $\lambda\phi$, the x,y coordinates must first be recalculated at the transmitting location $S_1$ with the aid of the coordinate transformer 44 on the basis of the course angle $\nu$ and the position of the search ship 12. The coordinate transformer 44 is a computer, which calculated the $\lambda,\phi$-coordinates in known manner to:

$$\phi = \phi_0 \pm r \cdot \cos(\nu + \chi)$$
$$\lambda = \lambda_0 \pm r \cdot \sin(\nu + \chi)$$

with $r = \sqrt{x^2 + y^2}$; $\chi = \arctan(y/x)$ and with the aid of the course angle $\theta$ and the coordinates $\phi_0$, $\lambda_0$ of the search ship 12 at the beginning, also in the transmitting location $S_1$.

Each register block 62 of the echo memory 42 can be a one-dimensional RAM. In the simplest manner the read-out device 43 consists of two counters. The x-counter is stepped by a clock generator and the y-counter by the carry pulse of the x-counter. If there is a y-address-signal on the read/write-input of one of the register blocks 62 the x-addresses of the register block 62 are called successively and the amplitude informations are read-out. If there is no y-address-signal on the read/write-inputs the amplitude informations are written under the x-address supplied by the coordinate computers 41 in the corresponding register block 62.

It will be understood that the above description of the present invention is susceptible to various modifications, changes and adaptations, and the same are intended to be comprehended within the meaning and range of equivalents of the appended claims.

What is claimed is:

1. In a method for underwater ranging with the aid of sonic pulses, by irradiating a given transmitting area with sonic energy pulses from a transmitter mounted in a marine vessel, receiving sonic energy echoes reflected from bodies in the transmitting area in a manner which is selective with respect to direction in a plurality of receiving sectors arranged in a fan shape, and associating the received echoes with respective reflection centers within the respective receiving sectors on the basis of associated sonic pulse travel times, the improvement wherein: said step of receiving is carried out on a second marine vessel different from the vessel carrying the transmitter and which travels at the side and rear of from the vessel carrying the transmitter at such a distance therefrom that the receiving sectors cover at least part of the given transmitting area; the azimuthal width of the transmitting area is made very small; and said step of associating comprises determining the relative distance between the two vessels and the direction of the transmitting area, relative to the heading of the second vessel, at least at the moment of transmission of each sonic pulse, in order to associate the reflection centers with the echoes.

2. Method as defined in claim 1 for detecting bodies at or near the water bottom.

3. Method as defined in claim 1 wherein the azimuthal width of the transmitting area is a submultiple of the azimuthal width of each receiving sector.

4. Method as defined in claim 3 wherein the azimuthal width of the transmitting area is less than one-tenth that of each receiving sector.

5. Method as defined in claim 3 wherein the azimuthal width of the transmitting area is maintained constant.

6. Method as defined in claim 1 comprising: causing the two vessels to travel essentially parallel to one another; causing the transmitting area to extend essentially transversely to the direction of travel; and causing the plurality of receiving sectors to extend forward of the second vessel.

7. Method as defined in claim 6 further comprising maintaining a fixed distance between the two vessels.

8. Method as defined in claim 1 wherein said step of associating comprises: assigning to each receiving sector an associated time window having upper and lower time limits, which time limits are determined on the basis of sonic energy travel times measured from the transmitter in the direction of the transmitting area up to the associated lateral boundary of the respective receiving sector and from there to the location of reception of the echoes, with the lower time limit being associated with the lateral boundary closer to the transmitter and the upper time limit being associated with the lateral boundary more remote from the transmitter location; determining the instant of transmission of a sonic pulse associated with a respective echo from the associated sound pulse travel time and the time window of the receiving sector in which the echo was received, the respective geometric location being determined for all those points for which the sum of their distances from the transmitting location at the determined moment of transmission, and from the receiving location at the moment of reception is constant and equal to the associated sound pulse travel time multiplied by the speed of sound in the water; and displaying a representation of the point of intersection of the curve formed by all those points with a line representing the transmitting direction originating at the transmitter at the moment of transmission, as the reflection center of the echo.

9. Method as defined in claim 8 wherein with every new transmitted pulse the time windows are shifted toward later times by an interval corresponding to the reciprocal of the transmitting pulse repetition rate, and the travel time of all sonic pulses is measured from the beginning of transmission of a first sonic pulse.

10. Method as defined in claim 8 wherein the time windows follow one another without interruption.

11. Method as defined in claim 10 wherein the time windows overlap slightly.

12. In apparatus for underwater ranging with the aid of sonic pulses, including transmitter means carried by a first marine vessel for emitting sonic energy pulses in a transmitting direction through a given transmitting area relative to the first vessel, receiver means defining a receiving area composed of a plurality of receiving sectors arranged in a fan pattern for receiving, in a direction selective manner, sonic energy echoes, and signal processing means connected to the receiver means for determining and indicating the locations of objects in the receiving area on the basis of sonic energy echoes therefrom, the improvement wherein:

said transmitter means are configured for emitting sonic energy in a pattern having a major lobe with a narrow azimuthal aperture angle which is substantially narrower than the aperture angle of each receiving sector;

said receiver means are carried by a second marine vessel which, during operation of said apparatus, is to travel at a known distance from, and to the side and rear of, the first vessel such that the receiving area extends forwardly of the second vessel and covers at least part of the major lobe of the pattern in which sonic energy is emitted by said transmitter means; and said signal processing means comprises echo equalizing means connected to said receiver means for associating echoes originating in the receiving area with the locations of objects in respective receiving sectors on the basis of associated sonic energy travel times and the distance between the vessels and the transmitting direction orientation at the moment of emission of the associated sonic energy pulse.

13. Apparatus as defined in claim 12 wherein the transmitting direction is transverse to the direction of travel of the vessels.

14. Apparatus as defined in claim 12 wherein adjacent receiving sectors overlap one another.

15. Apparatus as defined in claim 12 wherein the aperture angle of the major lobe of the energy emission pattern is less than one-tenth the aperture angle of each receiving sector.

16. Apparatus as defined in claim 12 further comprising two navigation position sensors each carried by a respective vessel and connected to said echo equalizing means for supplying thereto an indication of the location of each vessel.

17. Apparatus as defined in claim 12 further comprising two compasses each carried by a respective vessel and connected to said echo equalizing means for supplying thereto an indication of the heading of each vessel.

18. Apparatus as defined in claim 12 wherein said transmitter means comprise a plurality of sonic energy transmitting transducer elements arranged in a line extending essentially in the longitudinal direction of the first vessel.

19. Apparatus as defined in claim 18 wherein said transmitting transducer elements are arranged for causing the major lobe of the pattern in which energy is emitted by said transmitter means to be focused so that, with a selected operating distance between the first vessel and the bottom of the water, the pattern presents a focal line which extends at essentially a right angle to a vertical plane containing the line of transmitting elements at substantially the level of the water bottom.

20. Apparatus as defined in claim 19 wherein said transmitting transducer elements lie on a circular arc whose center of curvature lies below said transmitter means on the focal line.

21. Apparatus as defined in claim 12 wherein said echo equalizing means comprise a plurality of coordinate computers and window selection means connected to said computers for supplying each said computer with received signals associated with a respective emitted sonic energy pulse, each said computer being constructed for determining respective pulse travel times from the moment of direct reception at said receiving means of an emitted sonic energy pulse to the arrival at said receiving means of energy from that pulse after reflection from an object in the receiving area and for determining therefrom and from relative positions of the two vessels at the moments of pulse emission and energy reception and from the transmitting direction at the moment of pulse emission, the distance of that object from said transmitting means in the transmitting direction.

22. Apparatus as defined in claim 21 wherein the number of said coordinate computers is equal to the number of emitted sonic energy pulses which are simultaneously passing through the receiving area.

23. Apparatus as defined in claim 21 wherein said window selection means associates a plurality of time windows with each said coordinate computer, said windows being open in succession, each for a selected time period and each time window being associated with a respective receiving sector such that during each time window said computer is connected to receive echo signals associated with a respective receiving sector, the duration of each time window corresponding to the travel time of an emitted sonic pulse in the transmitting direction through the associated receiving sector and the beginning of the opening of a time window associated with a respective coordinate computer being shifted with respect to the beginning of opening of the corresponding time window associated with another said coordinate computer by a time interval which approximately corresponds to the period between the emission of successive sonic energy pulses.

24. Apparatus as defined in claim 23 wherein the beginning of opening of the time windows associated with said coordinate computers is actuated by the direct reception of corresponding emitted sonic energy pulses.

25. Apparatus as defined in claim 12 wherein said echo equalizing means comprise an echo memory for storing amplitude informations of the target echoes, said memory comprising a plurality of addressable register blocks corresponding in number to the number of said coordinate computers, with each said register block having an address input connected with a respective coordinate computer for storing representations of the distances of corresponding objects from said transmitting means, which representations are supplied by said coordinate computers to said address inputs of said register blocks as write-in addresses.

26. Apparatus as defined in claim 25 wherein said register blocks are arranged to be read out successively as amplitude information to a recording device.

* * * * *